(12) United States Patent
Moussa et al.

(10) Patent No.: US 9,670,378 B2
(45) Date of Patent: Jun. 6, 2017

(54) COATING COMPOSITIONS WITH IMPROVED ADHESION TO CONTAINERS

(75) Inventors: Youssef Moussa, Loveland, OH (US); Claudia Knotts, Milford, OH (US); Michael List, Milford, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 889 days.

(21) Appl. No.: 13/113,126

(22) Filed: May 23, 2011

(65) Prior Publication Data

US 2012/0301645 A1 Nov. 29, 2012

(51) Int. Cl.
| | |
|---|---|
| *B32B 1/02* | (2006.01) |
| *B65D 1/40* | (2006.01) |
| *C09D 133/02* | (2006.01) |
| *C09D 185/02* | (2006.01) |
| *C09D 167/00* | (2006.01) |
| *C08G 59/14* | (2006.01) |
| *C08G 59/30* | (2006.01) |
| *C09D 143/02* | (2006.01) |
| *C09D 133/06* | (2006.01) |
| *C08K 5/524* | (2006.01) |
| *C08L 63/00* | (2006.01) |

(52) U.S. Cl.
CPC ........ *C09D 167/00* (2013.01); *C08G 59/1422* (2013.01); *C08G 59/304* (2013.01); *C09D 133/02* (2013.01); *C09D 133/064* (2013.01); *C09D 143/02* (2013.01); *C08K 5/524* (2013.01); *C08L 63/00* (2013.01); *Y10T 428/1352* (2015.01)

(58) Field of Classification Search
CPC ......... B32B 1/02; C08L 63/00; C09D 167/00; C09D 143/02; C08K 5/527; C08K 5/524; C08G 59/1422; C08G 59/304; C08G 59/30
USPC ...... 428/35.7; 523/435, 416, 424; 206/524.3
See application file for complete search history.

(56) References Cited

U.S. PATENT DOCUMENTS

| | | | |
|---|---|---|---|
| 4,801,628 A | 1/1989 | Ashing et al. | |
| 6,159,549 A * | 12/2000 | Sundararaman et al. | .... 427/410 |
| 6,982,119 B2 | 1/2006 | Shi et al. | |
| 7,282,266 B2 | 10/2007 | Pawlik et al. | |
| 7,476,444 B2 | 1/2009 | Pawlik et al. | |
| 7,592,047 B2 | 9/2009 | O'Brien et al. | |
| 2002/0064599 A1 | 5/2002 | McAndrew | |
| 2003/0194563 A1 | 10/2003 | Shi et al. | |
| 2004/0071972 A1 | 4/2004 | Nakajima et al. | |
| 2004/0086718 A1 | 5/2004 | Pawlik et al. | |
| 2007/0260003 A1 * | 11/2007 | Cinoman et al. | ............. 524/439 |
| 2010/0075084 A1 | 3/2010 | O'Brien et al. | |
| 2010/0166972 A1 | 7/2010 | Weng et al. | |
| 2010/0178442 A1 | 7/2010 | O'Brien et al. | |

FOREIGN PATENT DOCUMENTS

| | | |
|---|---|---|
| BY | 12775 C1 | 2/2010 |
| RU | 2009106958 A1 | 11/2010 |
| WO | 9729854 | 8/1997 |
| WO | 9931186 | 6/1999 |
| WO | WO 2010/120604 | 10/2010 |
| WO | WO 2012/089657 | 7/2012 |

OTHER PUBLICATIONS

U.S. Appl. No. 13/113,127, filed May 23, 2011, entitled: "Coating Compositions for Containers".
U.S. Appl. No. 13/113,130, filed May 23, 2011, entitled: "Phosphated Polyesters and Coating Compositions Containing the Same".

* cited by examiner

*Primary Examiner* — Lee E Sanderson
(74) *Attorney, Agent, or Firm* — William J. Uhl

(57) ABSTRACT

A coating composition comprising a resinous binder and up to 10 percent by weight of the reaction product of (i) a phosphorus acid, and (ii) a polyglycidyl ether of cyclohexane dimethanol. The compositions are useful for coating containers of all sorts, such as food and beverage containers, and the reaction product provides enhanced adhesion of the coating to the substrate. The compositions can be formulated to be substantially free of bisphenol A (BPA) and derivatives thereof such as bisphenol A diglycidyl ether (BADGE).

8 Claims, No Drawings

COATING COMPOSITIONS WITH IMPROVED ADHESION TO CONTAINERS

FIELD OF THE INVENTION

The present invention relates to compositions that are useful for coating containers of various sorts such as food and beverage containers.

BACKGROUND OF THE INVENTION

A wide variety of coatings have been used to coat the surfaces of food and beverage containers. For example, metal cans are sometimes coated using coil coating or sheet coating operations, that is, a plane or coil or sheet of a suitable substrate, for example, steel or aluminum, is coated with a suitable composition and cured. The coated substrate is then formed into the canned body or canned end. Alternatively, the coating composition may be applied, for example, by spraying, dipping and roll coating, to the formed can and then cured. Coatings for food and beverage containers should preferably be capable of high speed application to the substrate and provide the necessary properties when cured to perform in a demanding end use. For example, the coating should be safe for food contact and have excellent adhesion to the substrate.

Many of the coating compositions for food and beverage containers are based on epoxy resins that are the polyglycidyl ethers of bisphenol A. Bisphenol A in packaging coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans. These compounds are nevertheless perceived by some as being harmful to human health. Consequently, there is a strong desire to eliminate these compounds from coatings for food and beverage containers. Accordingly, what is desired is a packaging coating composition for food or beverage containers that does not contain extractable quantities of BPA, BADGE or other derivatives of BPA and yet has excellent properties such as excellent adhesion to the substrate.

SUMMARY OF THE INVENTION

The present invention provides a coating composition comprising:
- (a) a resinous binder such as an acrylic polymer and/or a polyester polymer,
- (b) up to 10 percent by weight based on weight of resin solids in the coating composition of a reaction product comprising:
  - (i) phosphorus acid, and
  - (ii) polyglycidyl ether of cyclohexane dimethanol.

The above-mentioned reaction product provides excellent adhesion of the cured coating composition to the substrate to which it is applied.

The invention also provides for the resultant coated article comprising:
- (a) a substrate, and
- (b) a coating based on the above-identified composition deposited on the substrate.

The coating composition can be formulated such that it is substantially free of bisphenol A (BPA) and derivatives thereof, such as bisphenol A diglycidyl ether (BADGE).

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "acrylic polymer" refers to polymers prepared from one or more acrylic monomers.

As used herein, "a" and "the at least one" and "one or more" are used interchangeably. Thus, for example, a coating composition that comprises "a" polymer can be interpreted to mean the coating composition includes "one or more" polymers.

As used herein, the molecular weights are determined by gel permeation chromatography using a polystyrene standard. Unless otherwise indicated, molecular weights are on a number average basis (Mn).

The resinous vehicle is preferably an acrylic polymer and/or a polyester polymer. The acrylic polymer is preferably a polymer derived from one or more acrylic monomers. Furthermore, blends of acrylic polymers can be used. Preferred monomers are acrylic acid, methyl acrylate, ethyl acrylate, propyl acrylate, butyl acrylate, penta acrylate, hexyl acrylate, methacrylic acid, methyl methacrylate, ethyl methacrylate, propyl methacrylate, butyl methacrylate, penta methacrylate and hexyl methacrylate. The acrylic polymer may also contain hydroxyl groups which typically are derived from hydroxy-substituted acrylic or methacrylic acid esters. Examples include hydroxyethyl acrylate and hydroxypropyl methacrylate. The weight average molecular weight (Mw) of the acrylic polymer component is preferably at least 5,000 g/mole, more preferably from 15,000 to 100,000 g/mole. The acrylic polymer typically has an acid value of 30 to 70, such as 40 to 60 mg KOH/g; a hydroxyl value of 0 to 100, such as 0 to 70 mg of KOH/g and a glass transition temperature (Tg) of −20 to +100° C., such as +20 to +70° C.

The polyester polymers are prepared by processes well known in the art comprising the condensation polymerization reaction of one or more polycarboxylic acids with one or more polyols. Examples of suitable polycarboxylic acids are phthalic acid, isophthalic acid, terephthalic acid, 1,4-cyclohexane dicarboxylic acid, succinic acid, sebacic acid, methyltetrahydrophthalic acid, methyl hexahydrophthalic acid, tetrahydrophthalic acid, dodecane dioic acid, adipic acid, azelaic acid, naphthylene dicarboxylic acid, pyromellitic acid, dimer fatty acids and/or trimellitic acid.

The polyol component is, for example, selected from diols or triols and preferably from mixtures thereof. Examples of suitable polyols include ethylene glycol, 1,3-propanediol, diethylene glycol, dipropylene glycol, triethylene glycol, 1,4-butanediol, 2-methyl-1,3-propanediol, 1,4-cyclohexane dimethanol, 1,6-hexanediol, neopentyl glycol, trimethylolpropane and glycerol. The polyester polymer preferably has a number average molecular weight between 1000 and 20,000 g/mole.

The polyester polymers typically have an acid value between 0 and 20, such as 0 to 10 mg of KOH/g, a hydroxyl number between 50 to 200, such as 70 to 150 mg of KOH/g, a glass transition temperature (Tg) between −20° C. and +50° C., such as −10° C. and +40° C.

Typically curing agents are present in the resinous vehicle, which are reactive with the acrylic and polyester polymers. Suitable curing agents are phenolplasts or phenol-formaldehyde resins and aminoplast or triazine-formaldehyde resins. The phenol-formaldehyde resins are preferably of the resol type. Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581 LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Typically, the acrylic polymer and/or the polyester polymer is used in amounts of 40 to 90, preferably 30 to 70 percent by weight, and the crosslinking agent is present in amounts of 5 to 50, preferably 20 to 40 percent by weight, the percentages by weight being based on the weight of total resin solids in the coating composition.

The polyglycidyl ether of cyclohexane dimethanol is typically formed from reacting epihalohydrins with cyclohexane dimethanol in the presence of an alkali condensation and dehydrohalogenation catalyst such as sodium hydroxide or potassium hydroxide. Useful epihalohydrins include epibromohydrin, dichlorohydrin and especially epichlorohydrin. Also included are higher condensation products derived therefrom. The polyglycidyl ether has an epoxy equivalent weight of at least 150, typically about 150-1200, and a number average molecular weight of at least 300, typically from 300-2400. Typical polyglycidyl ethers are epoxide-terminated linear epoxy resins having a 1,2-epoxy equivalency not substantially in excess of 2, usually about 1.5 to 2, and is preferably difunctional with regard to epoxy, i.e., cyclohexane dimethanol diglycidyl ether.

The phosphorus acid which is reacted with the polyglycidyl ether of cyclohexane dimethanol can be a phosphinic acid, a phosphonic acid or is preferably phosphoric acid. The phosphoric acid can be in the form of an aqueous solution, for example, an 85 percent by weight aqueous solution, or can be 100 percent phosphoric acid or super phosphoric acid. The acid is provided in amounts of about 0.2-0.5 equivalents of phosphoric acid per equivalent of polyglycidyl ether, i.e., 0.2-0.45 P—OH groups per oxirane group. The reaction of the phosphorus acid with the polyglycidyl ether of cyclohexane dimethanol is typically conducted in organic solvent. The organic solvent is preferably a hydroxyl functional compound, typically a monofunctional compound having a boiling point of about 65 to 250° C. Among the hydroxyl functional compounds which may be used are aliphatic alcohols, cycloaliphatic alcohols and alkyl ether alcohols. Particularly preferred hydroxyl functional compounds are n-butanol and 2-butoxyethanol. The organic solvent for the reaction is typically present in amounts of about 25 to 50 percent by weight based on total weight of phosphorus acid, polyglycidyl ether of cyclohexane dimethanol and organic solvent.

The reactants and the organic solvent are typically mixed at a temperature between 50° C. to 95° C. and once the reactants are contacted, the reaction mixture is maintained at a temperature preferably between 90° C. to 200° C. The reaction typically is allowed to proceed for a period of about 45 minutes to 6 hours and polyester will be substantially oxirane defunctionalized, i.e., the epoxy equivalent weight will be at least 50,000.

The reaction product is typically present in the coating composition in amounts up to 10 percent by weight, preferably 0.1 to 5 percent by weight based on weight of resin solids in the coating composition. Amounts less than 0.1 percent by weight result in inferior adhesion of the coating composition to the substrate where amounts greater than 10 percent by weight provide no additional advantage.

Optional ingredients can be included in the coating composition. Typically, the coating composition will contain a diluent, such as water, or an organic solvent or a mixture or water and organic solvent to dissolve or disperse the resinous binder and the reaction product of a phosphorus acid and the polyglycidyl ether of cyclohexane dimethanol. The organic solvent is selected to have sufficient volatility to evaporate essentially entirely from the coating composition during the curing process such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. For aqueous compositions, the resinous vehicle typically has acid groups, such as acid functional acrylic polymers, that are at least partially neutralized with an amine to assist in the dispersion or dissolution of the resinous vehicle in the aqueous medium. When present, the diluent is used in the coating compositions in amounts of about 20 to 80, such as 30 to 70 percent by weight based on total weight of the coating composition.

Adjuvant resins such as polyether polyols and polyurethane polyols may be included in the coating compositions to maximize certain properties of the resultant coating. When present, the adjuvant resin is used in amounts of up to 50, typically 2-50 percent by weight based on weight of resin solids of the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid. It has been found that the amount of acid catalyst in the coating compositions of the invention is not as great as would normally be expected due to the presence of the reaction product of the phosphorus acid with the polyglycidyl ether of cyclohexane dimethanol. This reaction product is acidic and has been found to contribute to the cure of the coating composition.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention, are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof are not intentionally added but may be present in trace amounts because of unavoidable contamination from the environment. The compositions can also be substantially free and may be essentially free and may be completely free of Bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds derivatives or residues thereof.

As mentioned above, the coating compositions of the present invention can be applied to containers of all sorts and are particularly well adapted for use on food and beverage cans (e.g., two-piece cans, three-piece cans, etc.). Besides food and beverage containers, the coating compositions can be applied to containers for aerosol applications such as deodorant and hair spray.

Two-piece cans are manufactured by joining a can body (typically a drawn metal body) with a can end (typically a drawn metal end). The coatings of the present invention are suitable for use in food or beverage contact situations and may be used on the inside or outside of such cans. They are suitable for spray applied, liquid coatings, wash coatings, sheet coatings, over varnish coatings and side seam coatings.

Spray coating includes the introduction of the coating composition into the inside or outside of a preformed packaging container. Typical preformed packaging containers suitable for spray coating include food cans, beer and beverage containers, and the like. The sprayed preformed container is then subjected to heat to remove the residual solvents and harden the coating.

A coil coating is described as the coating, typically by a roll coating application, of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing preformed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets". Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

EXAMPLES

The following examples are offered to aid in understanding of the present invention and are not to be construed as limiting the scope thereof. Unless otherwise indicated, all parts and percentages are by weight.

Example A

Reaction Product of Phosphoric Acid and Cyclohexane Dimethanol Diglycidyl Ether 110.14 g of 85 percent orthophosphoric acid and 89.30 g of butanol is added to the flask. The mixture is heated to 230° F. (110° C.) under nitrogen inert blanket. When the temperature is reached, the nitrogen blanket is turned off and a premix of 463.30 g of 1,4-cyclohexane dimethanol glycidyl ether (0.286 equivalents of phosphoric acid per equivalent of epoxy) and 151.27 g of butanol is fed over a period of 2 hours and 10 minutes. The batch temperature is maintained below 245° F. (118° C.) during the addition. After the completion of the 2 hours and 10 minutes feed, 13.7 g of butanol is added to the flask and temperature is reduced to 219° F. (104° C.) and held for additional 2 hours. Additional 17.30 g of butanol is added to the flask and the resulting reaction product had a resin solids content of 65.91 percent by weight.

Example B (Comparative)

Reaction Product of Phosphoric Acid and Bisphenol A Diglycidyl Ether

The reaction product was prepared as generally described in Example A using 0.286 equivalents of phosphoric acid per equivalent of epoxy.

Example 1

A clear varnish included from the following mixture of ingredients:

| Ingredient | Parts by Weight | Non-Volatile Weight |
| --- | --- | --- |
| Acrylic Resin Component[1] | 524.8 | 158.1 |
| Sucrose Polyol[2] | 87.413 | 87.413 |
| Cymel 303[3] | 107.591 | 107.591 |
| 1,4-Cyclohexane Dimethanol Diglycidyl Ether of Example A | 2.769 | 1.825 |
| Phenyl Acid Phosphate (catalyst) | 1.110 | 0.833 |
| Deionized Water | 134.300 | 0.000 |

[1]Carboxylic acid group containing acrylic resin partially neutralized with amine and dispersed in water.
[2]VORANOL 360 from Dow Chemical Co.
[3]Methylated melamine crosslinker from Cytec Industries.

The ingredients were added to a container in the order indicated with mild agitation to form a clear varnish.

Example 2 (Comparative)

A clear varnish was prepared as generally described in Example 1 but substituting bisphenol A diglycidyl ether of Example B for the 1,4-cyclohexane dimethanol diglycidyl ether of Example A.

Example 3 (Comparative)

A clear varnish was prepared as generally described in Example 1 but omitting the 1,4-cyclohexane dimethanol diglycidyl ether of Example A.

The clear varnishes of Examples 1-3 were applied to flattened clean uncoated aluminum beverage cans using a 0.006 wire wound draw bar. The coated cans were baked for 180 seconds in a 400° F. (204° C.) electric forced draft oven followed by immersion for 30 minutes in boiling deionized water. The coated cans were then dried with a towel and crosshatch scribed to make 100 3×3 mm squares. Scotch 610 tape was applied over the scribed area and rubbed down to adhere to the coating. The tape was removed in a quick pull. The scribed area of the panel was examined for loss of coating counting squares and estimating the percent of area of adhesion loss. The results are as follows:

Example 1—No loss, 100% adhesion
Example 2—No loss, 100% adhesion
Example 3—40% loss, 60% adhesion Coated cans as described above were also immersed for 10 minutes at 180° F. (82° C.) in a 1% Joy detergent solution. The coated cans were dried and tested for adhesion as described above. The results are as follows:

Example 1—No loss, 100% adhesion
Example 2—No loss, 100% adhesion
Example 3—90% loss, 10% adhesion

The invention claimed is:
1. A coating composition comprising:
 (a) a resinous binder comprising:
  (i) an acrylic polymer having reactive functional groups,
  (ii) an aminoplast crosslinker having functional groups reactive with the functional groups of (i),
 (b) 0.5 to 5 percent by weight based on weight of resin solids in the coating composition of a reaction product comprising:
  (i) phosphoric acid, and
  (ii) cyclohexane dimethanol diglycidyl ether.
2. The coating composition of claim 1 in which the acrylic polymer is present in amounts of 40 to 90 percent by weight; the crosslinking agent is present in amounts of 5 to 50 percent by weight; the percentages by weight being based on total weight of resin solids in the composition.
3. The coating composition of claim 1 in which the phosphoric acid is used in amounts of 0.2 to 0.5 equivalents per equivalent of oxirane.
4. A coated article comprising:
 (a) a substrate, and
 (b) a coating deposited on at least a portion thereon from the composition of claim 1.
5. The coated article of claim 4 in which the substrate is a container.
6. The coated article of claim 5 in which the substrate is a can for food or beverage.
7. The coated article of claim 4 in which the coating is deposited on the exterior of the container.

8. The coated article of claim 7 in which the coating is a cured thermoset composition.

* * * * *